US012664842B2

(12) United States Patent
Gallini

(10) Patent No.: US 12,664,842 B2
(45) Date of Patent: Jun. 23, 2026

(54) CONTROL SYSTEM FOR THE CONTROL OF ACCESSES IN A ROOM

(71) Applicant: INTEREL PTE LTD, Singapore (SG)

(72) Inventor: Stefano Francesco Florian Gallini, Dubai (AE)

(73) Assignee: INTEREL PTE LTD, Singapore (SG)

( * ) Notice: Subject to any disclaimer, the term of this patent is extended or adjusted under 35 U.S.C. 154(b) by 214 days.

(21) Appl. No.: 18/533,540

(22) Filed: Dec. 8, 2023

(65) Prior Publication Data

US 2024/0203182 A1 Jun. 20, 2024

(30) Foreign Application Priority Data

Dec. 14, 2022 (IT) ........................ 102022000025572

(51) Int. Cl.
*G07C 9/00* (2020.01)
*G07C 9/28* (2020.01)

(52) U.S. Cl.
CPC ........... *G07C 9/00904* (2013.01); *G07C 9/28* (2020.01)

(58) Field of Classification Search
CPC .. G07C 9/00904; G07C 9/28; G07C 9/00309; G07C 9/00571; G07C 9/27; H04L 63/10; G05B 15/02; G05B 19/418; G05B 2219/2642; G06Q 50/12
USPC ........................................................... 340/5.2
See application file for complete search history.

(56) References Cited

U.S. PATENT DOCUMENTS

| | | | | |
|---|---|---|---|---|
| 5,861,806 | A * | 1/1999 | Vories | G08B 5/36 340/556 |
| 6,236,303 | B1 * | 5/2001 | Wagner | G08B 5/36 340/286.08 |
| 7,053,757 | B2 * | 5/2006 | Buckingham | G08B 3/10 340/328 |
| 7,061,393 | B2 | 6/2006 | Buckingham et al. | |
| 7,336,158 | B2 * | 2/2008 | Lombardo | G08B 3/10 379/167.12 |
| 7,378,982 | B2 * | 5/2008 | Mohamed | G09F 21/049 340/468 |

(Continued)

OTHER PUBLICATIONS

Italian Search Report and Written Opinion, mailed Jun. 6, 2023, from Italian Application No. IT202200025572, 6 pages.

(Continued)

*Primary Examiner* — Nam V Nguyen
(74) *Attorney, Agent, or Firm* — Workman Nydegger

(57) ABSTRACT

Control system (1) for the control of accesses in a room comprising an authorization system (2), connected or connectable to an automatic lock (L), comprising an interaction device (3) which is usable by a user to request for an access to and/or information on a room, a signaling device (4) configured to emit a sound and/or visual signal representative of a status condition of the room and a detection system (5) of the room status.
The authorization system (2) is configured to receive a request for access and/or information from the user and to notify the request for access and/or information to the signaling device (4) and the detection system (5).
The signaling device (4) is configured to receive a signal of the room status condition from the detection system (5) to emit a sound and/or visual signal representative of the received room status condition.

21 Claims, 5 Drawing Sheets

(56) References Cited

U.S. PATENT DOCUMENTS

| | | | | |
|---|---|---|---|---|
| 7,474,210 | B2 * | 1/2009 | Roberts | G07C 9/28 340/568.1 |
| 11,343,473 | B2 * | 5/2022 | Scalisi | H04N 7/188 |
| 11,575,537 | B2 * | 2/2023 | Scalisi | H04M 11/04 |
| 2018/0240203 | A1 * | 8/2018 | Cronin | G06Q 50/12 |

OTHER PUBLICATIONS

Leonidis, Asterios et al., "An Intelligent Hotel Room", Dec. 3, 2013, SAT 2015 18th International Conference, Austin, TX, Sep. 24-27, 2015; [Lecture Notes in Computer Science; Lect. Notes Computer], Springer, Berlin, Heidelberg, pp. 241-246.

* cited by examiner

CONTROL SYSTEM FOR THE CONTROL OF ACCESSES IN A ROOM

TECHNICAL FIELD

The present invention relates to a control system for the control of accesses. In particular, the present invention finds particular application in the hotel sector and more in particular in the management of accesses of staff in the room of a user. The term "room" is intended as a living space of any type which is temporary (e.g., hotel) or permanent (e.g., apartment, house, . . . ) or intended for third party guests.

More in general, the present invention thus finds application in the hotel sector and/or in the residential sector and/or in the housing units sector.

PRIOR ART

To date, the use of signs or special cardboard elements to be hung on the knobs of doors is known in order to identify the particular wishes of a user residing in the room such as "do not disturb" or consenting or not to entrance for cleaning the room.

Furthermore, panels arranged along the corridor are known, which show the status of the room, or the use of bells to warn the user in the room. However, such solutions are hardly elegant and, especially in the event of a user's forgetfulness, can be annoying or lead to embarrassing solutions for the guest, such as the entry of an unsolicited staff member.

Furthermore, it is even more relevant that such known solutions define a danger to guests' privacy, as it is communicated externally (precisely in the corridor) if the guest is present in the room or not (danger of theft).

OBJECTS OF THE PRESENT INVENTION

The technical task of the present invention is thus to provide a control system which is capable of overcoming the prior-art drawbacks which have emerged.

Therefore, the object of the present invention is to provide a control system which allows to notify the staff of an internal condition of the room in order to prevent unpleasant inconveniences to the guest users in the room.

The technical task specified and the object specified are substantially attained by a control system comprising the technical features as set out in one or more of the accompanying claims. The dependent claims correspond to possible embodiments of the invention.

In particular, the technical task specified and the object specified are substantially reached by a control system for the control of accesses in a room comprising an authorization system, connected or connectable to an automatic lock, comprising an interaction device which is usable by a user to request for an access to and/or information on a room, a signaling device configured to emit a sound and/or visual signal representative of a status condition of the room and a detection system of the room status.

The authorization system is configured to receive a request for access and/or information from the user and to notify the request for access and/or information to the signaling device and the detection system. The signaling device is configured to receive a signal of the room status condition from the detection system to emit a sound and/or visual signal representative of the received room status condition.

Advantageously, the present solution allows a virtualization of the corridor panels with all their functions such as "do not disturb," "room cleaning," "user presence," "bell" and the like.

Further features and advantages of the present invention will become more apparent from the indicative and thus non-limiting description of an embodiment of a control system.

BRIEF DESCRIPTION OF THE FIGURES

Such a description will be set out below with reference to the accompanying drawings, which are provided solely for illustrative and therefore non-limiting purposes, in which.

DESCRIPTION OF ONE OR MORE PREFERRED, BUT NON-EXCLUSIVE, EMBODIMENTS OF THE PRESENT INVENTION

With reference to the appended figures, 1 denotes in its entirety a control system for the control of accesses in a room.

The term room can be understood as any closed room in which there is at least one access door, whether it is a private room, a hotel room, a common room or other similar room.

The control system 1 comprises an authorization system 2 connected or connectable to an automatic lock "L." Preferably, the authorization system 2 can be connected by cable or by wireless communication to the automatic lock "L" so as to control it, as will be described in the following of the present description.

The authorization system 2 comprises an interaction device 3 which is usable by a user to request for an access to and/or information on a room. The term "user" is intended to mean, for example, a member of the staff, a cleaner or other user with special authorizations and/or assigned to carry out certain services inside the room and/or another guest of the same facility or a guest outside the facility, where the term "facility" refers to the hotel sector and/or the residential sector and/or the housing units sector.

The interaction device 3 can be made in the form of a touch panel, a keypad, a fingerprint reading surface or other similar device.

Figure 5A:
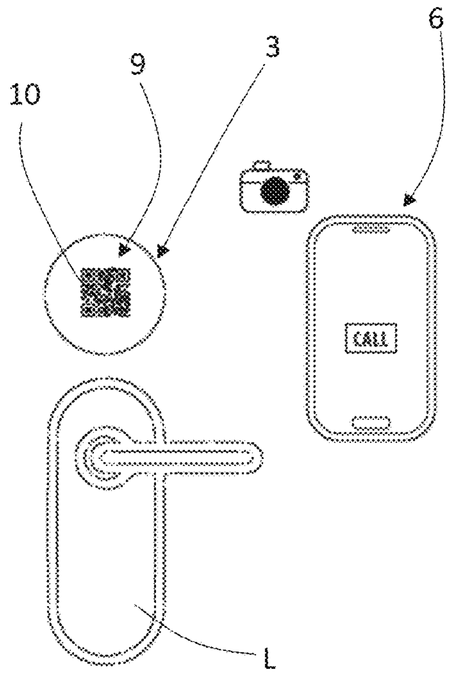
FIGS. 5*a*-5*d* show a schematic representation of a further alternative embodiment in which the interaction device 3 comprises a display 9 with a QR code and possibly a button 8 for interacting with a service (e.g., bell or intercom device) inside the room.
Figure 5B:
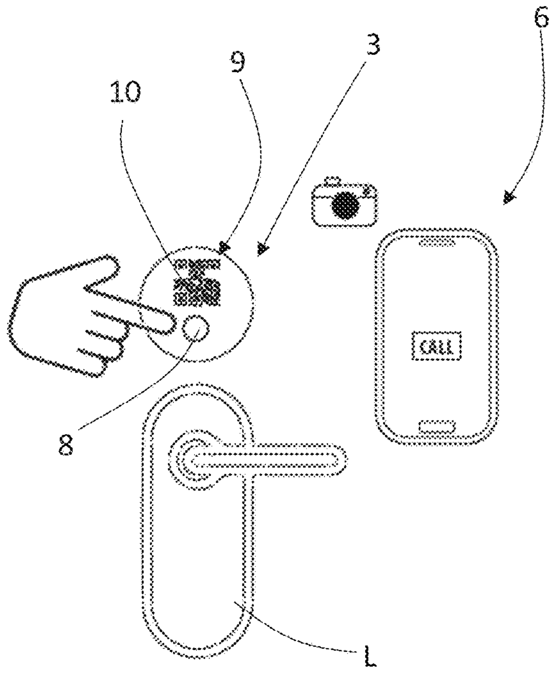

Preferably, the interaction device 3 comprises an NFC or RFID antenna or reading surface or other analogous reading means. It should be emphasized that the interaction device 3 can be made, at least in part, virtually for example by means of access control systems for virtual keys which reside on a terminal (e.g., smartphone) or on other electronic devices. In the embodiment illustrated in FIGS. 5*a* and 5*b*, the interaction device 3 comprises a button 8 configured to interact with services (bell, voice intercom, . . . ) within the room as a function of said room status condition. Specifically, the aforesaid button 8 is configured to interact with a bell and/or a voice intercom device arranged inside the room as a function of said room status condition.

Alternatively, the button 8 is configured to interact with a communication device arranged outside the room.

The communication device can in turn be configured to interact with the lock "L" to open it or enable the remote opening thereof by means of a remote unlocking signal.

Furthermore, the communication device can also be configured to view, talk to, or establish a video call with the user present outside the room which has operated the button 8, by means of a special communication system which will be described in the following.

Advantageously, the button 8 also serves to ensure the presence of the user/operator in the vicinity/at the room since they must perform a physical operation.

According to another aspect of the present invention, a countdown representative of a time window within which the user can interact with the button 8 can be associated with the pressing action of the aforesaid button 8, otherwise it is considered that no user/operator is present.

The control system 1 further comprises a signaling device 4 configured to emit a sound and/or visual signal representative of a status condition of the room.

Alternatively, the signaling device could be of the virtual type, i.e., implemented by means of software (e.g., smartphone application) on a terminal/electronic device. For example, the signaling device could be an application on the smartphone.

Additionally, such an application could be configured to offer the possibility of acting or not (function blocked) on certain functions depending on the status of the room and the role that the customer or the staff has in relation to the access to that space. For example, the application already presents which options can be selected by the user by means of the smartphone 10 (e.g., bell not available if the status is set to DND).

That is, as a function of a user's interaction with the interaction device 3, the signaling device 4 is configured to provide the user him-/herself with information about a condition of the room (by way of example, such conditions can be "occupied, unrented/vacant, do not disturb, make up room"). In particular, the signaling device 4 is configured to provide the user him-/herself with a combination of room information, for example:

- Unrented and occupied (room occupied for example for maintenance),
- unrented and unoccupied,
- rented and occupied,
- rented and unoccupied,
- rented and DND (the customer has set do not disturb),
- rented and MUR (the room is being cleaned).

Figure 4A:
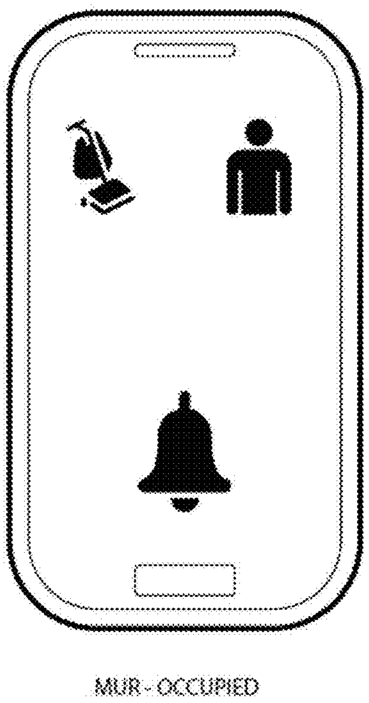
FIGS. 4*a*-4*h* show a representation of an alternative embodiment in which the interaction device 3 and/or the signaling device 4 are implemented by means of a smartphone application.
Figure 4B:
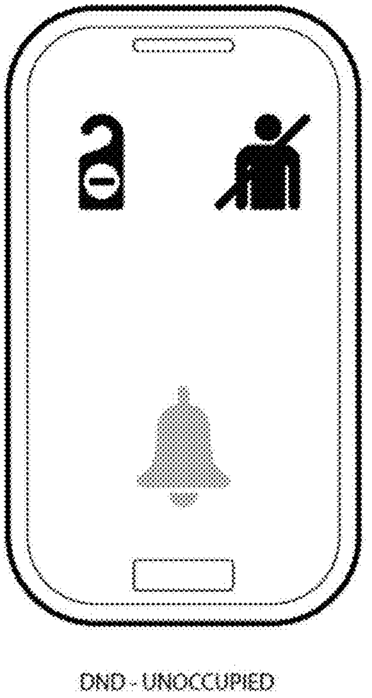
Figure 4C:
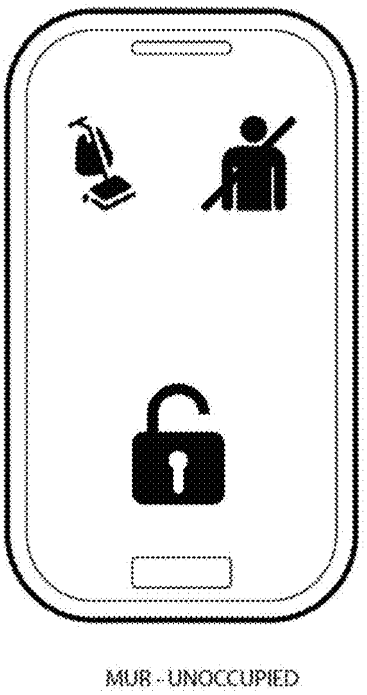
Figure 4D:
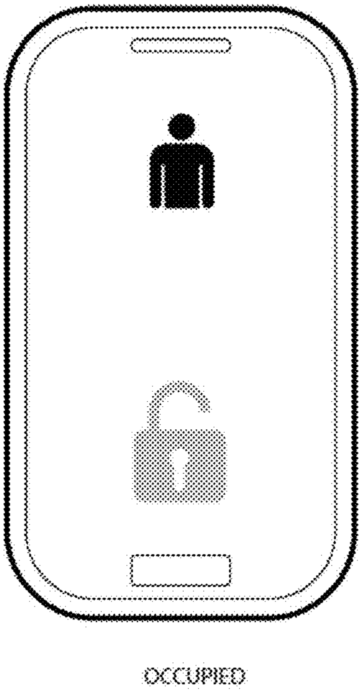
Figure 4E:
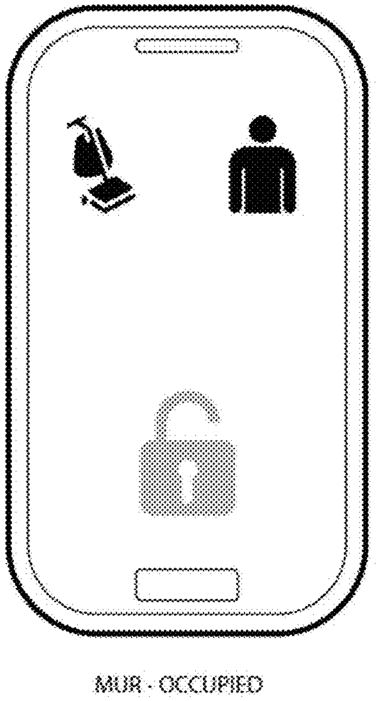
Figure 4F:
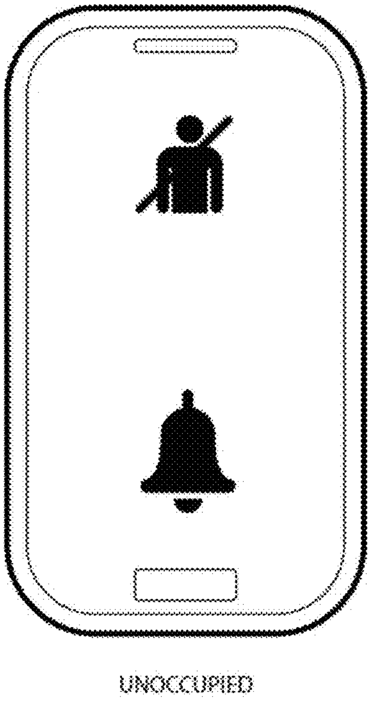
Figure 4G:
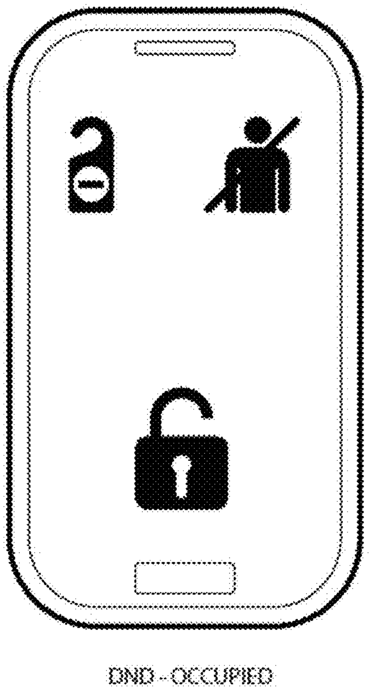
Figure 4H:
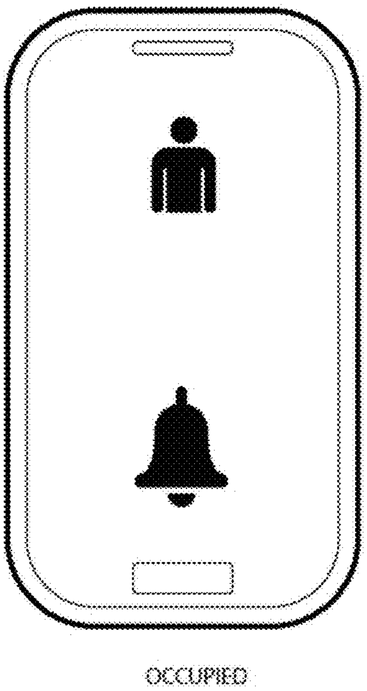

FIGS. 4*a*-4*f* show examples of such combinations of information in which:

- in FIG. 4*a* the room is occupied but being cleaned and it is thus possible to ring the bell;
- in FIG. 4*b* the room is not occupied but "do not disturb" has been set and thus the bell function is disabled;
- in FIG. 4*c* the room is not occupied and is being cleaned and it is thus possible to open the lock;
- in FIG. 4*d* the room is occupied and thus the unlocking of the lock is disabled;
- in FIG. 4*e* the room is occupied but being cleaned and thus the unlocking of the lock is disabled;
- in FIG. 4*f* the room is not occupied and it is thus possible to ring the bell;
- in FIG. 4*g* the room is not occupied but "do not disturb" has been set and it is thus possible to unlock the lock;
- in FIG. 4*h* the room is occupied (without "do not disturb") and it is thus possible to ring the bell.

Preferably, the status condition is representative of a presence or absence of a guest inside the room.

The term guest is generally intended to indicate a person occupying the room and entitled to occupy it and thus to close the room for privacy reasons.

Preferably, the status condition is representative of a do not disturb request of the guest.

Preferably, the status condition is representative of a permission to access for a requested service (such as room service, room cleaning request or other similar services).

Preferably, the status condition can be a combination of the specific status conditions above.

Preferably, and as shown for example in the appended figures, the signaling device 4 comprises at least one light reproduction device configured to operate intermittently and/or emit different colors as a function of the status condition. Preferably, the light reproduction device is an LED light or an OLED light or other similar light.

The appended figures show a signaling device 4 in the form of a light reproduction device in which two lights 4*a* and 4*b* are present. The light 4*a* is red while the light 4*b* is green and one of the two is switched on as a function of a particular internal status condition of the room following the user's interaction with the interaction device 3. For example, if the user is authorized to enter the room, the green light 4*b* would be switched on, while if he/she is not authorized, the red light 4*a* would be switched on. Both lights could also flash intermittently in order to communicate further messages related to the status condition of the room.

Preferably, the signaling device 4 can comprise a sound reproduction device configured to emit an intermittent sound and/or a voice message. Therefore, the sound reproduction device allows the sending of a sound or voice message identifying a room status condition.

Preferably, the signaling device 4 can comprise both the light reproduction device and the sound reproduction device.

Advantageously, the use of the light reproduction device and/or the sound reproduction device results in a reduced energy consumption. Therefore, the use of only rechargeable batteries having a long life thanks to the low consumption of the signaling device 4 could be useful for powering the control system 1.

The control system 1 further comprises a detection system 5 of the room status. That is, the detection system 5 is used to know the status condition inside the room.

Preferably, the detection system 5 comprises means 5*a* for detecting the presence of a guest inside the room. Thereby, the detection system 5 is capable of communicating the presence or absence status condition of the guest inside the room.

Such means 5*a* can be obtained in the form of a motion sensor, or devices configured to identify specific activities within the room identifying a presence of the guest (such as turning on or off lights, the use of sockets or televisions or other devices inside the room and other similar activities), or any other similar means which can allow to know if the room is occupied or not.

Preferably, the detection system 5 further comprises a control unit 5*b*, inside the room, configured to set the status condition to the request not to disturb or to the access permission for a requested service.

The control unit 5*b* can be made in the form of a panel inside the room or other terminal (such as a television, an interface device such as a smartphone or other similar terminals) which allows an internal interaction by the guest in order to set the requested status condition.

In the light of the components of the control system 1 described above, the authorization system 2 is configured to receive a request for access and/or information from the user and to notify the request for access and/or information to the signaling device 4 and said detection system 5. The signaling device 4 is configured to receive a signal of the room status condition from the detection system 5 and/or from the authorization system 2 to emit a sound and/or visual signal representative of the received room status condition.

That is, after the interaction between the user and the interaction device 3, signals are received from the detection system 5 identifying the status condition and a respective signal is sent to the signaling device 4 identifying the status condition detected (and/or set by the guest) by the detection system 5.

Thereby, the user is effectively informed whether a guest is present inside the room and whether or not he/she wants to be disturbed and/or allow the entry or not as a function of a requested service.

For example, the user may want to enter the room in order to clean it.

If the guest was present and the same had indicated through the detection system 5 to consent to the user's entry to carry out the cleaning, at the time of the interaction between the user and the interaction device 3 a signal indicative of such a status condition would have been communicated to the authorization system 2 and notified to the signaling device 4. Next, the signaling device 4 would have emitted the sound and/or visual signal indicative of the user's permission to enter even if the guest is present in the room. At this point, the authorization system 2 would send an opening signal to the automatic lock "L" to unlock it or it would do so after a further interaction by the user with the interaction device 3.

It follows that, whether the guest was present or absent in the room, if he/she had indicated a "do not disturb" status condition, the signaling device 4 would have emitted a sound and/or visual signal identifying such a condition and the automatic lock would not have been unlocked (unless with special and/or extraordinary permissions by the user).

In a preferred but non-limiting embodiment, the authorization system 2 further comprises at least one control device 6 configured to interact with the interaction device 3.

The control device 6 is representative of at least one command function which is executed as a function of the room status condition.

That is, the control device 6 allows the execution of different actions or of individual specific actions in order to know the status condition, to request access to the room and/or to request further actions.

Such actions can also be defined by the hotel's policies. For example, if a certain hotel wants the user (e.g., a hotel operator) to be able to ring the bell inside the room upon the second detection of the control device 6 (e.g., card) even if the room status is set to the "do not disturb" condition, it is possible to define a specific action which performs such an action desired by the owner.

Preferably, the control device 6 is made in the form of a token. The term token is intended as a card (as represented in the appended figures) or other similar device which can be handled by a user to bring it closer to the interaction device 3 or in the immediate vicinity.

Even more preferably, the authorization system comprises a token for each command function.

Preferably, the control device 6 is defined by software installed or installable in a user interface device such as, but not limited to, a hand-held device or a smartphone. Such an embodiment can envisage that all the command functions are selectable and executable through the user interface device itself or that some are in any case assigned for the use of a token.

Preferably, if the interaction device 3 comprises an NFC or RFID antenna or reading surface (or other similar reading device as indicated above), the control device 6 would comprise an NFC or RFID circuit (or similar).

Figure 1:
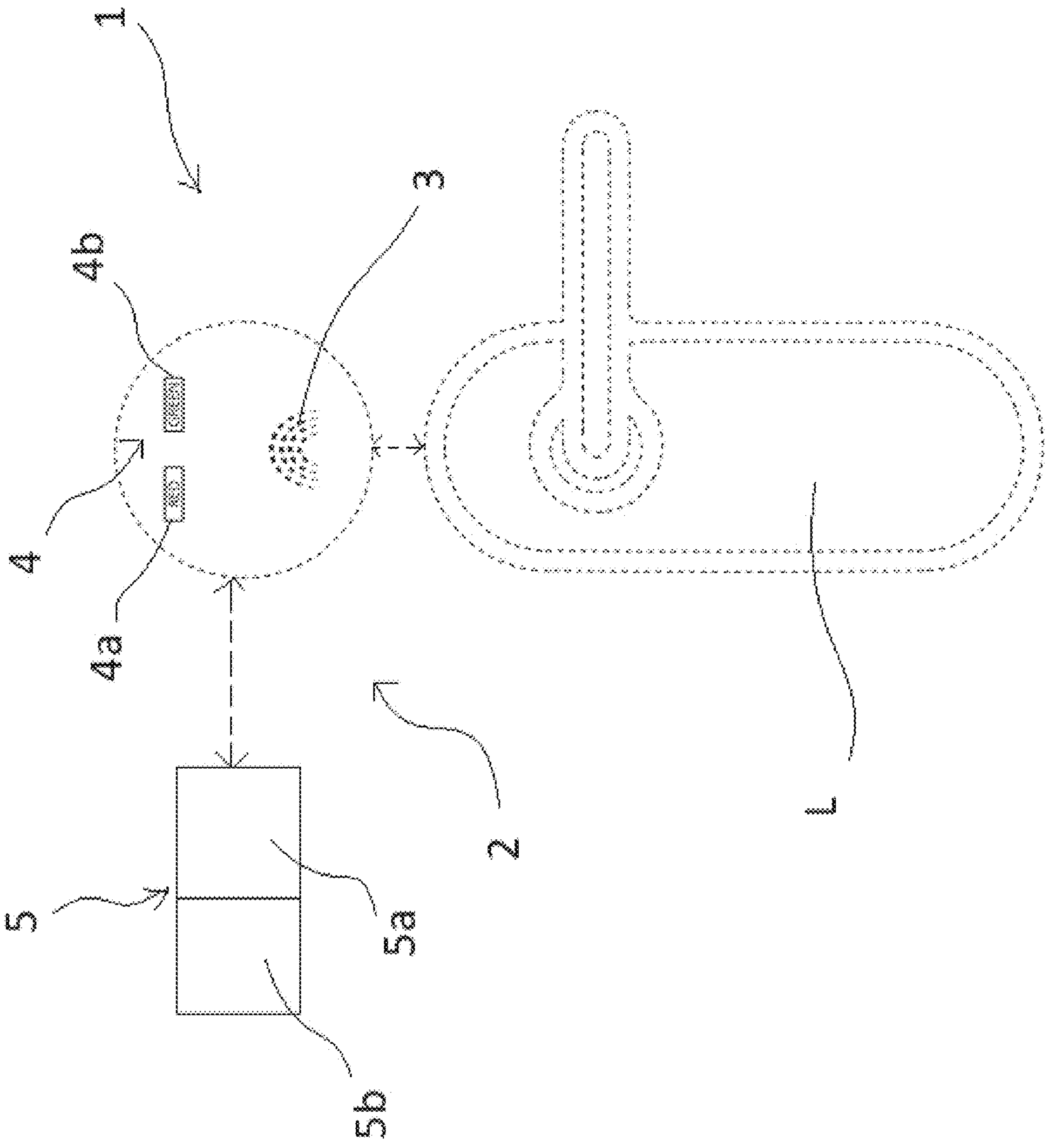
FIG. 1 is a schematic representation of the system subject-matter of the present invention.
Figure 2:
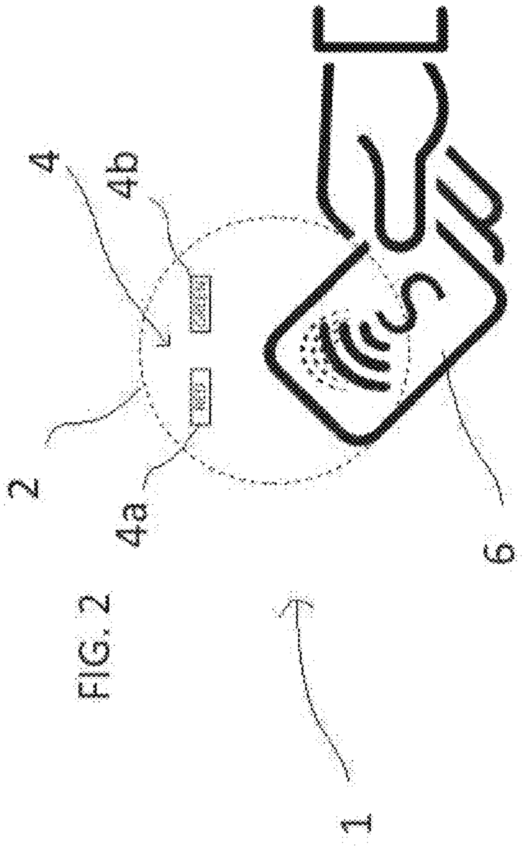
FIG. 2 and FIG. 3 are schematic representations of different features of the system subject-matter of the present invention.

Preferably, the control device 6 is representative of at least one command function configured to know the room status condition. FIG. 2 shows for representative purposes a control device 6 in the form of a token (card) identified by the letter "S" of Status which, once brought near the interaction device 3, allows the sending by the authorization system 2 of a request signal to the detection system 5 about the status condition so as to notify the signaling device 4 so that the same can emit the specific sound and/or visual signal identifying the status condition.

For example, once the card "S" is brought near the interaction device 3, the signaling device 4 could turn on the red light 4*a* to identify the absence of the guest. Alternatively, there could be a single light which would intermittently turn on a number of times, identifying the presence or not of the user or his/her desire to not be disturbed or to request the execution of a service.

Preferably, the control device 6 is representative of a command function configured to execute the opening of the automatic lock "L." The authorization system 2 is configured to send an opening signal to the automatic lock "L" as a function of the status condition. Therefore, if the user sees a visual and/or audio signal identifying a permission to enter on the signaling device 4, bringing the control device 6 near the interaction device 3 would lead to the opening of the door (i.e., the unlocking of the automatic lock "L").

However, if the user does not want to be disturbed, approaching the control device 6 to perform the opening would lead to a sound and/or visual signal emitted by the signaling device 4 representative of a denied access. Alternatively, the control device 6 could be representative of both the command function related to the knowledge of the status condition and the command function related to the opening of the door (i.e., unlocking the automatic lock "L"). In such a configuration, the status condition is first shown through the signaling device 4 and, after a reduced or no time interval, the command function for opening the automatic lock "L" is executed.

That is, if the status condition shows that the guest consents to the entry of a user into the room, bringing the control device 6 near the interaction device 3 would also lead to the unlocking of the automatic lock. Conversely, if the user does not want to be disturbed or does not want anyone to enter their room in general, only the visual and/or sound signal representative of the denied access will be emitted.

It should be noted that said automatic lock L is provided with said signaling device 4 configured both to signal the approach of an interaction device 3 (e.g., card), as already known in the field of locks, and to precisely emit said sound and/or visual signal representative of said received room status condition. In other words, a signaling device already present in the lock is exploited, also used to signal the room status (after communication with the interior) without the need for further external screens ("corridor panel"). Preferably, the control system 1 can further comprise an alert device 7 arranged inside the room and configured to draw the attention of the guest. In this regard, the control device 6 could be representative of a command function configured to activate the alert device 7.

Preferably, the alert device 7 is made in the form of a bell, a visual reproduction device or a vibrating element arranged inside the room and all configured to alert the user in the least invasive manner possible (for example with a message depicted on the television, the reduction of the luminous intensity of the lights in the room or other similar means).

Figure 3:
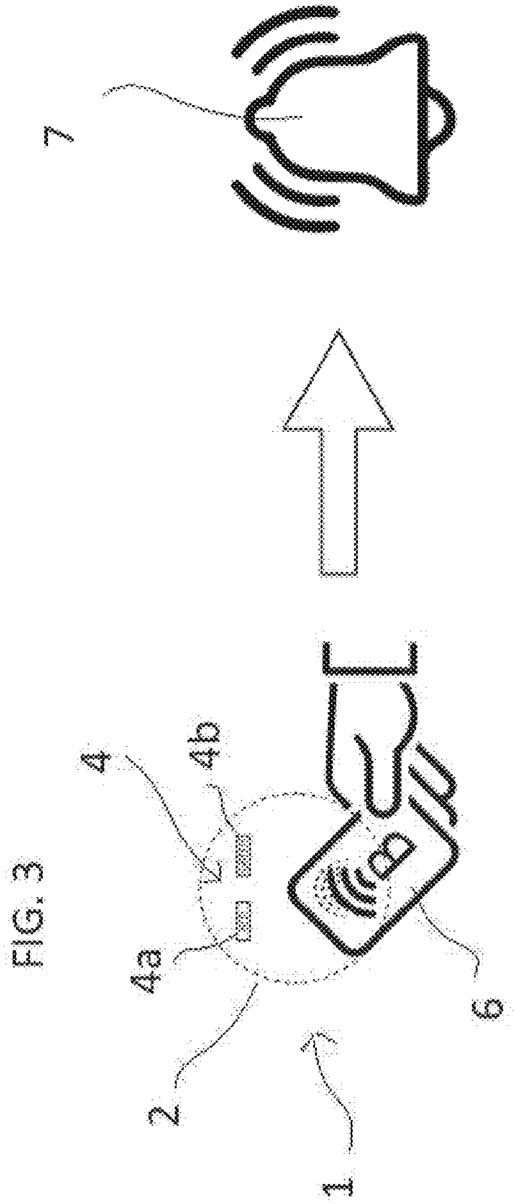

FIG. 3 shows for representative purposes a control device 6 in the form of a token (card) identified by the letter "B" of Bell which, once brought near the interaction device 3, allows the activation of the alert device 7. However, if the guest does not want to be disturbed or is not present in the room, the signaling device 4 would emit a sound and/or visual signal representative of such a status condition and the alert device 7 would not be activated.

As already mentioned above, the interaction device 3 can comprise a screen 9 (FIGS. 5*a*-5*d*) on which said authorization system 2 is configured to display a code 10 detectable by means of a control device 6. The control device 6 is thus configured to detect said code 10 and to receive from said authorization system 2 a signal confirming whether or not to interact with services inside the room (e.g., bell or intercom device).

Figure 5C:
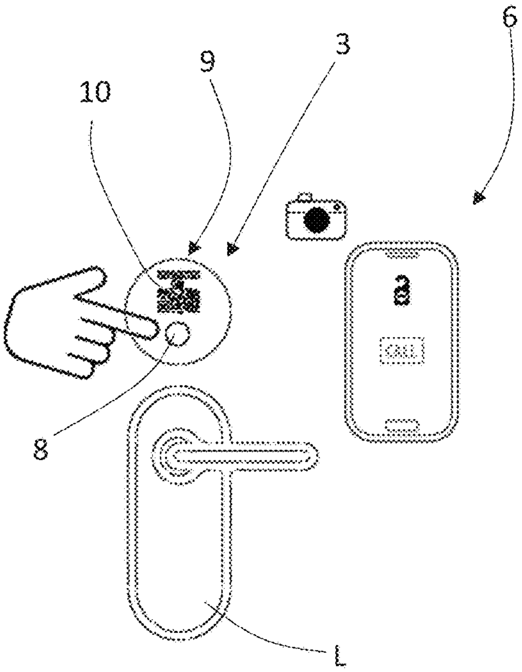
Figure 5D:
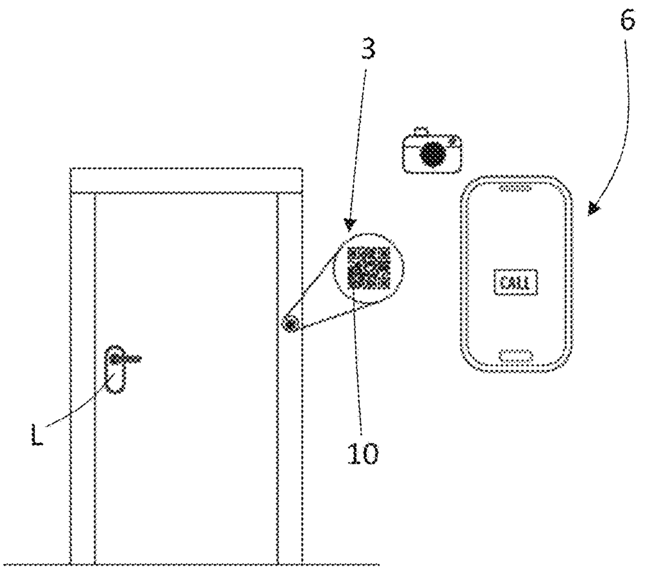

FIG. 5*c* symbolically represents the returned "do not disturb" signal indicating that the control device 6 is not authorized to ring the bell or to communicate vocally with the inside of the room.

By way of example, the code can be a QR code and/or barcode and/or sound code, and the control device 6 detects it through a camera and software which makes a connection to the authorization system.

Preferably, such a code 10 can be of regenerable type at predetermined time intervals.

Alternatively or in addition to the above, the interaction device 3 can comprise a Bluetooth transmitter, preferably a beacon, configured to interact with said control device 6 so as to confirm the presence of a user holding said control device 6 outside the room. That is, if the control device 6 receives the beacon signal, it means that it is located in a predefined range therefrom and that therefore the user/operator is near the room.

Preferably, the beacon is preferably configured to receive said control device 6 within a predefined time range following which the authorization system 2 does not receive any control device 6.

In accordance with some additional aspects of the present invention, the control system 1 can comprise a communication system, such as a camera configured to frame the user requesting an access to and/or information on the room. Such a camera is connected to the interaction system 2 and is configured to generate a vision signal which is forwarded to a vision device. Such a vision device comprises a vision screen and can be a thermostat, a mobile device (smartphone), a TV or anything else not expressly indicated herein.

In particular, if such a vision device is arranged inside the room (e.g., thermostat, TV, smartphone present inside the room) the contents of the vision signal are visible from inside the room.

Alternatively, if such a vision device is arranged in another position (e.g., smartphone arranged outside the room) the contents of the vision signal are visible from outside the room.

In addition, as already stated, the vision device can be integrated in the aforesaid communication device (e.g., smartphone) and can also be configured to view or establish a video call with the user, present outside the room who has operated the button 8, by means of said camera. Advantageously, the present invention is capable of overcoming the drawbacks which have emerged from the prior art.

Advantageously, the present invention allows to notify the user of an internal condition of the room.

Thereby, the present invention advantageously allows to prevent unpleasant inconveniences which may undermine the privacy of the guest or make their stay not live up to expectations.

In particular, the present invention allows to correctly notify the user about the guest's requests and thus to prevent unwanted entries or to prevent any type of misunderstanding in an efficient and immediate manner.

The invention claimed is:

1. A control system for the control of accesses in a room comprising:

an authorization system, connected or connectable to an automatic lock, comprising an interaction device which is usable by a user to request for an access to and/or information on the room;

a signaling device configured to emit a sound and/or visual signal representative of a room-status condition;

a detection system configured to determine the room-status condition; wherein said authorization system is configured to:

receive a request for access and/or information from a user;

notify said request for access and/or information to said signaling device and said detection system;

said signaling device being configured to receive a signal of the room-status condition from the detection system and to emit a sound and/or visual signal representative of the received room-status condition; and wherein the authorization system comprises at least one control device configured to interact with said interaction device and representative of at least one command function, the at least one command function being performed as a function of the room-status condition.

2. The control system according to claim 1, wherein said signaling device comprises at least one light reproduction device configured to operate intermittently and/or emit different colors as a function of said room-status condition, said light reproduction device being an LED (Light-Emitting Diode) light or an OLED (Organic Light-Emitting Diode) light.

3. The control system according to claim 1, wherein said signaling device comprises a sound reproduction device configured to emit an intermittent sound and/or a voice message.

4. The control system according to claim 1, wherein said room-status condition is representative of a presence or absence of a guest inside said room.

5. The control system according to claim 4, wherein said detection system comprises means for detecting the presence of said guest inside said room.

6. The control system according to claim 1, wherein said room-status condition is representative of a request not to disturb a guest.

7. The control system according to claim 6, wherein said detection system further comprises a control unit, inside said room, configured to set said status condition to said request not to disturb or to an access permission for a requested service.

8. The control system according to claim 1, wherein said room-status condition is representative of an access permission for a requested service.

9. The control system according to claim 1, wherein said control device is representative of a command function configured to know said room-status condition.

10. The control system according to claim 1, wherein said control device is representative of a command function configured to perform an opening of said automatic lock, said authorization system sending an opening signal to said automatic lock as a function of said room-status condition.

11. The control system according to claim 1 wherein said authorization system comprises said automatic lock provided with said signaling device configured both to signal an approach of the interaction device, and to emit said sound and/or visual signal representative of said received room-status condition of the room.

12. The control system according to claim 1, further comprising an alert device arranged inside said room and configured to draw an attention of a guest and wherein said control device is representative of a command function configured to activate said alert device, said alert device is made in a form of a bell, a visual reproduction device or a vibrating element.

13. The control system according to claim 1, wherein said control device is made in a form of a token, said authorization system comprising a token for each command function.

14. The control system according to claim 13, wherein said control device comprises an NFC (Near Field Communication) or RFID (Radio-Frequency Identification) circuit and wherein said interaction device comprises an NFC or RFID antenna or reading surface.

15. The control system according to claim 1, wherein said control device is defined by a software installed or installable in a user interface device.

16. The control system according to claim 1 wherein the interaction device comprises a button configured to interact with services within the room as a function of said room-status condition.

17. The control system according to claim 16 wherein said button is configured to interact with a bell; and/or with a voice and/or video intercom device arranged inside the room as a function of said room-status condition; and/or with another communication device arranged outside the room.

18. The control system according to claim 1 wherein the interaction device comprises a screen on which, said authorization system is configured to display a code detectable by means of a control device; said control system being configured to detect said code and to receive from said authorization system a signal confirming whether or not to interact with services within the room.

19. The control system according to claim 1 wherein the interaction device comprises a Bluetooth transmitter configured to interact with said control device so as to confirm a presence of a user holding said control device outside the room.

20. The control system according to claim 19, wherein the Bluetooth transmitter is configured to receive said control device within a predefined time range following which the authorization system does not receive any control device.

21. The control system according to claim 1, wherein the control unit comprises a camera configured to frame the user requesting an access to and/or information on the room; said camera being connected to the interaction device and being configured to generate a vision signal which is forwarded to a vision/communication device to be able to view the user and/or interact therewith in a video communication.

* * * * *